P. PANCHULA.
NON-SKIDDING DEVICE.
APPLICATION FILED FEB. 21, 1914.
1,099,513.
Patented June 9, 1914.
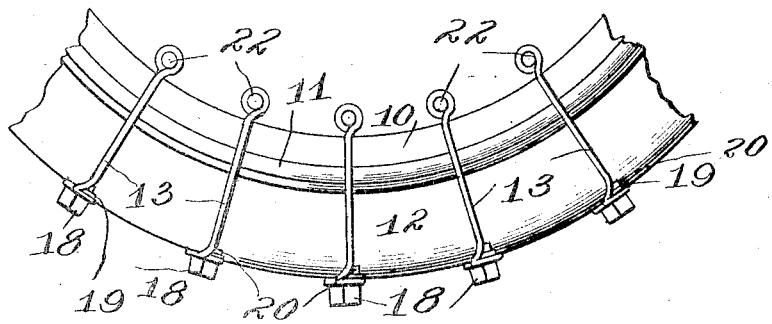
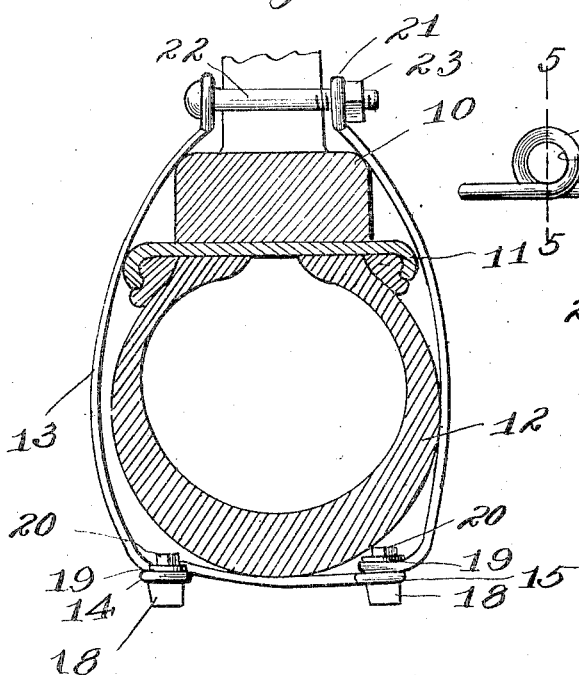
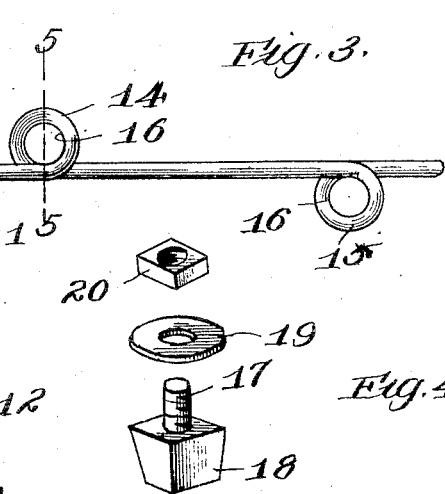
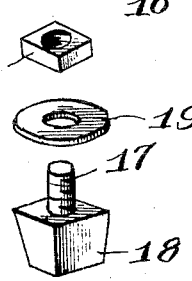
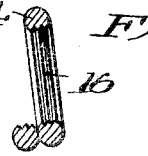
Inventor
Paul Panchula,
Witnesses

UNITED STATES PATENT OFFICE.

PAUL PANCHULA, OF DIXONVILLE, PENNSYLVANIA.

NON-SKIDDING DEVICE.

1,099,513.

Specification of Letters Patent.

Patented June 9, 1914.

Application filed February 21, 1914. Serial No. 820,221.

*To all whom it may concern:*

Be it known that I, PAUL PANCHULA, a subject of the Emperor of Austria-Hungary, residing at Dixonville, in the county of Indiana and State of Pennsylvania, have invented certain new and useful Improvements in Non-Skidding Devices, of which the following is a specification.

This invention relates to new and useful improvements in non-skidding devices.

An object of the present invention is the provision of a non-skid link complete in itself and capable of positioning at any desired point upon the tire of a wheel and employed in plurality if desired.

A further object of the invention is to provide a simple and inexpensive means for use in preventing the side slipping and skidding of automobile wheels which may be used in any number by attaching the separate devices circumferentially of the wheel and having a predetermined desired spacing.

A still further object is to provide a non-skid member formed primarily of a single piece double looped wire member mounting studs or calks positionable adjacent the tread of a wheel and retained by a bolt adjustment at the ends of the member.

With the above objects in view and others that will appear as the nature of the invention is better understood, the same consists in the novel combination and arrangement of parts hereinafter fully described, illustrated in the accompanying drawings and pointed out in the appended claims.

In the drawings forming a part of this application and in which like designating characters refer to corresponding parts throughout the several views:—Figure 1 is a side elevation of a portion of a wheel showing five of the devices clamped thereon. Fig. 2 is a radial transverse sectional view through a tire, rim and felly illustrating the position of the invention affixed thereto. Fig. 3 is a top plan view of one of the link devices detached having the bolt and calks removed therefrom. Fig. 4 is a detail view of one of the calks removed showing its washer and locking nut, and Fig. 5 is an enlarged transverse vertical sectional view taken on the line 5—5 of Fig. 3.

Referring more in detail to the drawings, the felly 10 is illustrated with the usual rim 11 and pneumatic tire 12 mounted thereon while as shown in Fig. 1, five of the devices which constitute the invention are illustrated operatively positioned thereon.

The entire device as best shown in Fig. 2 forms a clamping link and is positionable in any number around the vehicle wheel.

The main elements of the device comprise the one piece wire link 13 of substantially arch-shape, but coiled into oppositely positioned loops 14 and 15 as best shown in Fig. 3. Said loops are preferably internally screw-threaded as at 16 for the reception of the threaded shank 17 of the calk 18. The shank 17 being positionable through the perforation 16 of a loop, receives a washer 19 and thereover a locking nut 20 which securely locks the calk to the arch link. The link being formed preferably of resilient metal, spans the pneumatic tire and its rim and felly with the calk members 18 positioned adjacent the tread portion of the tire while the bases of each link are provided with integral loops 21 which are in alinement for the reception of a bolt 22 secured therethrough by means of the nut 23.

The complete operation of the device will be apparent from the above detailed description in that the removable calks 18 being secured in the two loops 14 and 15 of the links, the latter are spread apart sufficiently to allow their engagement over the wheel and whereupon the locking bolts 22 are positioned in place and securely held by their turn nuts 23. A tightening of the nut 23 further draws the base loops 21 of the links together exerting a drawing pressure upon the entire link and thereby slightly compressing the pneumatic tire and more firmly affixing the link thereto. It is evident as shown in Fig. 1 that any desired number of these links may be so positioned while any two thereof may be locked at any desired distances apart although it has been found preferable to position a separate link contiguous to each of the spokes of the wheel.

It is obvious that any desired number of tread loops for the reception of calks may be employed while the locking bolts may be supplanted by an equivalent adjusting means, but the forms of the invention herein shown and described are what are believed to be preferable embodiments thereof although the right is reserved to make minor changes in the form, proportion and details of construction without departing from the spirit and scope of the invention.

Having thus described the invention and in what manner the same is designed for use, what is claimed as new and desired to be secured by Letters Patent of the United States is:—

1. A non-skid element comprising a one-piece link bent into two intermediate loops and base loops, calks positioned in said intermediate loops, and locking means positioned between said base loops.

2. A non-skid link comprising a single piece of wire bent into two oppositely intermediate loops and two terminal base loops, threaded calks secured in said intermediate loops, and a tensioning locking member mounted in said base loops.

3. As an article of manufacture, a non-skid link comprising a one piece wire member bent into base loops and a plurality of oppositely positioned loops intermediate the ends thereof, said intermediate loops being internally screw-threaded, and calks with threaded shanks screw threaded into said intermediate loops.

4. As an article of manufacture, a non-skid link comprising a one piece wire arch member bent into intermediate loops and alining terminal loops, a hold-fast device between said terminal loops, said intermediate loops lying in staggered relations upon different sides of the link member and in a plane substantially perpendicular to that of the link, calks having screw-threaded shanks received in said intermediate loops and locking devices for said calks.

In testimony whereof I affix my signature in presence of two witnesses.

PAUL PANCHULA.

Witnesses:
  NICK PANCHULA,
  SAMUEL TEKELY.